US010199013B2

(12) United States Patent
Padgett

(10) Patent No.: US 10,199,013 B2
(45) Date of Patent: *Feb. 5, 2019

(54) DIGITAL IMAGE COMPARISON

(71) Applicant: Google Inc., Mountain View, CA (US)

(72) Inventor: Steven Padgett, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 141 days.

This patent is subject to a terminal disclaimer.

(21) Appl. No.: 15/266,995

(22) Filed: Sep. 15, 2016

(65) Prior Publication Data

US 2017/0004807 A1 Jan. 5, 2017

Related U.S. Application Data

(63) Continuation of application No. 14/740,212, filed on Jun. 15, 2015, now Pat. No. 9,449,582, which is a continuation of application No. 13/597,203, filed on Aug. 28, 2012, now Pat. No. 9,064,448.

(60) Provisional application No. 61/529,835, filed on Aug. 31, 2011.

(51) Int. Cl.
*G06K 9/00* (2006.01)
*G09G 5/14* (2006.01)
*G06F 3/0485* (2013.01)
*G06F 3/0484* (2013.01)
*G09G 5/34* (2006.01)
*G06T 11/60* (2006.01)

(52) U.S. Cl.
CPC .............. *G09G 5/14* (2013.01); *G06F 3/0485* (2013.01); *G06F 3/04842* (2013.01); *G06T 11/60* (2013.01); *G09G 5/346* (2013.01); *G09G 2340/04* (2013.01); *G09G 2354/00* (2013.01)

(58) Field of Classification Search
CPC ....... G06F 3/0485; G09G 5/14; A61B 5/7445; A61B 6/463
See application file for complete search history.

(56) References Cited

U.S. PATENT DOCUMENTS

| | | | |
|---|---|---|---|
| 5,729,471 A | 3/1998 | Jain et al. | |
| 5,917,989 A | 6/1999 | Ducatte et al. | |
| 6,894,707 B2 | 5/2005 | Nemoto | |
| 7,003,153 B1 * | 2/2006 | Kerofsky | G06T 5/009 348/E5.119 |
| 7,239,805 B2 | 7/2007 | Uyttendaele et al. | |
| 7,296,239 B2 | 11/2007 | Shen et al. | |
| 8,732,601 B2 | 5/2014 | Licato et al. | |

(Continued)

OTHER PUBLICATIONS

Argawala, et al., "Interactive Digital Photomontage", ACM Transactions on Graphics (TOG), 2004, 9 pages.

(Continued)

*Primary Examiner* — Li Liu
(74) *Attorney, Agent, or Firm* — IP Spring

(57) ABSTRACT

A method for digital image comparison includes, by a computer executing a single instance of an application program stored in a memory of the computer, receiving a first input from a user of the computer, identifying related portions of a first digital image and a second digital image. The method also includes receiving user interactions to view portions of the first digital image. The method also includes, responsive to the user interactions, changing a view of portions of the second digital image that are related to the first digital image.

20 Claims, 7 Drawing Sheets

(56) References Cited

U.S. PATENT DOCUMENTS

| | | | |
|---|---|---|---|
| 2008/0100612 A1 | 5/2008 | Dastmalchi et al. | |
| 2008/0205783 A1 | 8/2008 | Sandrew | |
| 2008/0249402 A1 | 10/2008 | Szucs | |
| 2008/0279447 A1 | 11/2008 | Friedlander et al. | |
| 2009/0153648 A1 | 6/2009 | Quennesson | |
| 2009/0161982 A1 | 6/2009 | Tico et al. | |
| 2010/0020238 A1 | 1/2010 | Kim et al. | |
| 2010/0331047 A1 | 12/2010 | Bilcu et al. | |
| 2011/0026609 A1 | 2/2011 | Sitrick | |
| 2011/0122147 A1 | 5/2011 | Yasukawa et al. | |
| 2011/0122251 A1 | 5/2011 | Schmidt | |
| 2011/0141103 A1* | 6/2011 | Cohen | G02B 21/367 345/419 |
| 2011/0268369 A1 | 11/2011 | Richards et al. | |
| 2016/0054897 A1* | 2/2016 | Holmes | G06F 9/4445 715/740 |

OTHER PUBLICATIONS

Jang, et al., "A Smart Clustering Algorithm for Photo Set Obtained from Multiple Digital Cameras", ACM, 2009, 8 pages.

USPTO, Final Office Action for U.S. Appl. No. 13/597,203, dated May 29, 2014, 10 pages.

USPTO, Notice of Allowance for U.S. Appl. No. 14/740,212, dated May 23, 2016, 15 pages.

USPTO, Non-final Office Action for U.S. Appl. No. 13/597,203, dated Sep. 16, 2014, 7 pages.

USPTO, Notice of Allowance for U.S. Appl. No. 13/597,203, dated Feb. 13, 2015, 8 pages.

USPTO, Non-final Office Action for U.S. Appl. No. 13/597,203, dated Feb. 5, 2014, 8 pages.

\* cited by examiner

DIGITAL IMAGE COMPARISON

CROSS REFERENCE TO RELATED APPLICATIONS

This application is a continuation of U.S. patent application Ser. No. 14/740,212, filed Jun. 15, 2015 and titled DIGITAL IMAGE COMPARISON, which is a continuation of U.S. patent application Ser. No. 13/597,203, filed Aug. 28, 2012 and titled DIGITAL IMAGE COMPARISON (now U.S. Pat. No. 9,064,448), which claims the benefit of U.S. Provisional Patent Application No. 61/529,835, filed Aug. 31, 2011 and titled DIGITAL IMAGE COMPARISON, the disclosure of all of which are incorporated herein in their entirety by reference.

BACKGROUND

Aspects of the present disclosure relate to digital image comparison.

Users sometimes take multiple photographs of the same scene, later discarding one or more photographs of the particular scene. Determining which photographs to discard and which photographs to keep can include comparing photographs of the same scene. Image viewing applications may allow viewing a single image or photograph at time, thus images of the same scene are compared by flipping back and forth between images, where only one image is displayed on the screen at any given time. A user may also open multiple instances of an image viewing application and minimizing the window for each of the instances so that the images may be viewed at the same time.

SUMMARY

Methods, systems, and apparatus for digital image comparison. In one aspect, a method includes, by a computer executing a single instance of an application program stored in a memory of the computer, receiving a first input from a user of the computer, identifying related portions of a first digital image and a second digital image. The method also includes receiving user interactions to view portions of the first digital image. The method also includes, responsive to the user interactions, changing a view of portions of the second digital image that are related to the first digital image. In another aspect, a method includes, by a computer executing a single instance of an application program stored in a memory of the computer, responsive to an input from a user of the computer, examining an identification of a plurality of digital images stored in the memory of the computer. The method also includes rendering the plurality of digital images for display to the user on one display device communicatively coupled to the computer, wherein the plurality of digital images are viewable by the user simultaneously on the display device communicatively coupled to the computer. Other embodiments of this aspect include corresponding systems, apparatus, and computer programs, configured to perform the actions of the methods, encoded on computer storage devices.

These and other aspects can include one or more of the following features. The method can include examining an indication of a type of image processing, and performing the image processing on one of the plurality of digital images. The method can include examining an indication of a type of image processing, and performing the image processing on each of the plurality of digital images. The image processing can include an enlargement transformation. The image processing can include a reduction transformation. The image processing can include rotation transformation. The image processing can include a color correction. The color correction can include one or more of a brightness adjustment, a contrast adjustment, color mapping, color balancing, quantization, and color transformation to a different color space. The image processing can include interpolation. The image processing can include image registration. The image processing can include image differencing. The image processing can include image morphing. The image processing can include image recognition.

Particular implementations of the subject matter described in this specification can be implemented so as to realize one or more of the following advantages. Example embodiments of the present disclosure provide a solution for digital image comparison wherein multiple digital images may be compared and modified within a single instance of a computer application program. Multiple digital images of the same scene may be easily compared and modified to help determine which digital images to keep, and which digital images to discard.

DETAILED DESCRIPTION

Embodiments of the present disclosure are described herein in the context of digital image comparison. Reference will now be made in detail to implementations of the present disclosure as illustrated in the accompanying drawings. The same reference indicators will be used throughout the drawings and the following detailed description to refer to the same or like parts.

Figure 1:
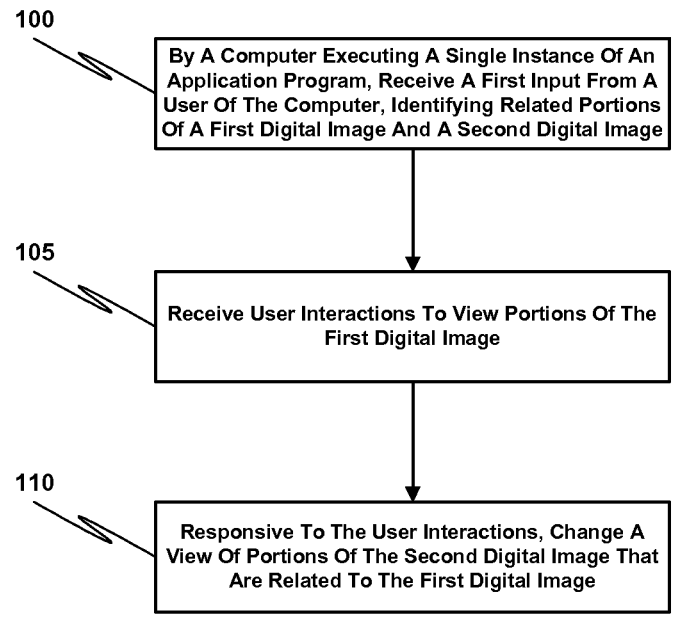
FIG. 1 is a flow diagram that illustrates an example method for digital image comparison.

FIG. 1 is a flow diagram that illustrates a method for digital image comparison, in accordance with one embodiment. The processes illustrated in FIG. 1 may be implemented in hardware, software, firmware, or a combination thereof. For example, the processes illustrated in FIG. 1 may be implemented by user device 305 of FIG. 3. At 100, a computer executing a single instance of an application stored in a memory of the computer receives an input from a user of the computer, identifying related portions of a first digital image and a second digital image. At 105, user interactions to view portions of the first digital image are received. At 115, responsive to the user interactions to view portions of the first digital image, a view of portions of the second digital image that are related to the first digital image, are changed.

Although the present disclosure refers to a first digital image and a second digital image, more than two digital images can be used. For example, if three digital images are selected for viewing, responsive to the user interactions to view portions of the first digital image, the following are changed:

a view of portions of the second digital image that are related to the first digital image; and a view of portions of the third digital image that are related to the first digital image.

According to one embodiment, the method includes identifying what areas of each image are related so that they are displayed and can be processed simultaneously. Related areas may be identified using, for example, content-based image retrieval (CBIR), image retrieval based on region shape similarity, or image similarity based on graph matching.

According to one embodiment, once related portions of digital images are identified, the digital image processing technique may be applied differently to each selected image. For example, a digital image processing technique that is based on a histogram of a first selected image may be applied differently to a second selected image.

According to one embodiment, a user may select less than all of the shown images for digital image processing. For example, if content shown in a first digital image is not shown in a second digital (e.g., due to different angle, different cropping, etc.), image processing may not be applicable to the second image. In this case, a user may choose to process less than all of multiple digital images being shown to the user.

Figure 2:
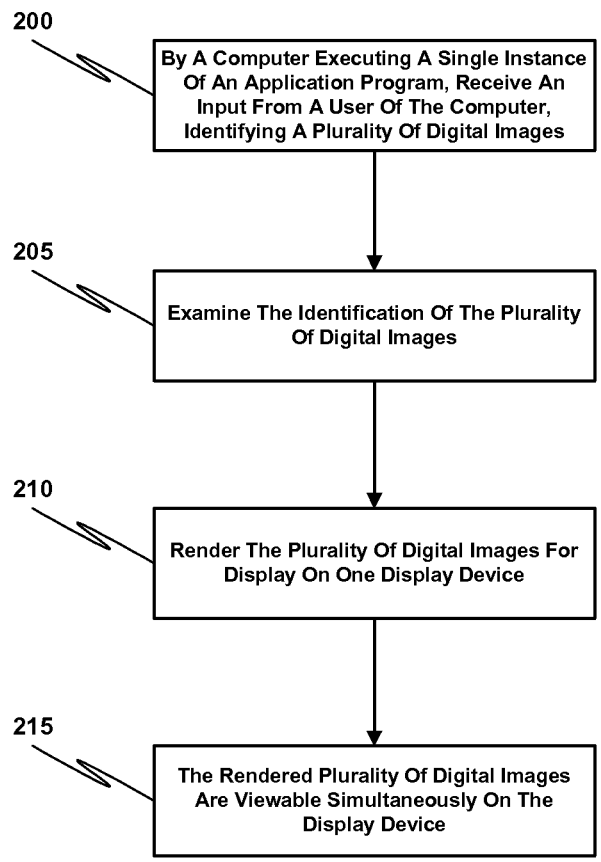
FIG. 2 is a flow diagram that illustrates an example method for digital image comparison.

FIG. 2 is a flow diagram that illustrates a method for digital image comparison, in accordance with one embodiment. The processes illustrated in FIG. 2 may be implemented in hardware, software, firmware, or a combination thereof. For example, the processes illustrated in FIG. 2 may be implemented by user device 305 of FIG. 3. At 200, a computer executing a single instance of an application stored in a memory of the computer receives an input from a user of the computer, identifying a plurality of digital images. At 205, the identification of the plurality of digital images is examined. At 210, the plurality of digital images is rendered for display on one display device communicatively coupled to the computer. At 215, the rendered digital images are viewable by the user simultaneously on the display device.

According to one embodiment, a user may select one of the digital images for a particular type of digital image processing. According to another embodiment, a user may select more than one of the digital images for a particular type of image processing. If more than one of the digital images are selected, the digital image processing is performed simultaneously on each of the selected digital images, allowing the user to view the results of the digital image procession on the selected digital images. Example types of digital image processing are discussed further below.

Example types of image processing include an enlargement transformation ("zoom in"), a reduction transformation ("zoom out"), and a rotation transformation. A user may select one or more of the digital images for such transformations.

The example types of image processing also include a color correction. Color corrections include brightness adjustment, contrast adjustment, color mapping, a color balancing, quantization, and color transformation to a different color space.

Further examples of image processing include interpolation, image registration, image differencing, image morphing, and image recognition.

According to one embodiment, when multiple digital images are selected, scrolling a first digital image will cause the other selected images to also move in a synchronous manner with respect to the first digital image. For example, suppose a first digital image and a second digital image are selected. Scrolling the first digital image to the left will cause the computer executing a single instance of an image processing program to synchronously scroll the second digital image to the left as well. Thus the user is able to see the effect of scrolling both digital images merely by scrolling one of the selected digital images.

Figure 3:
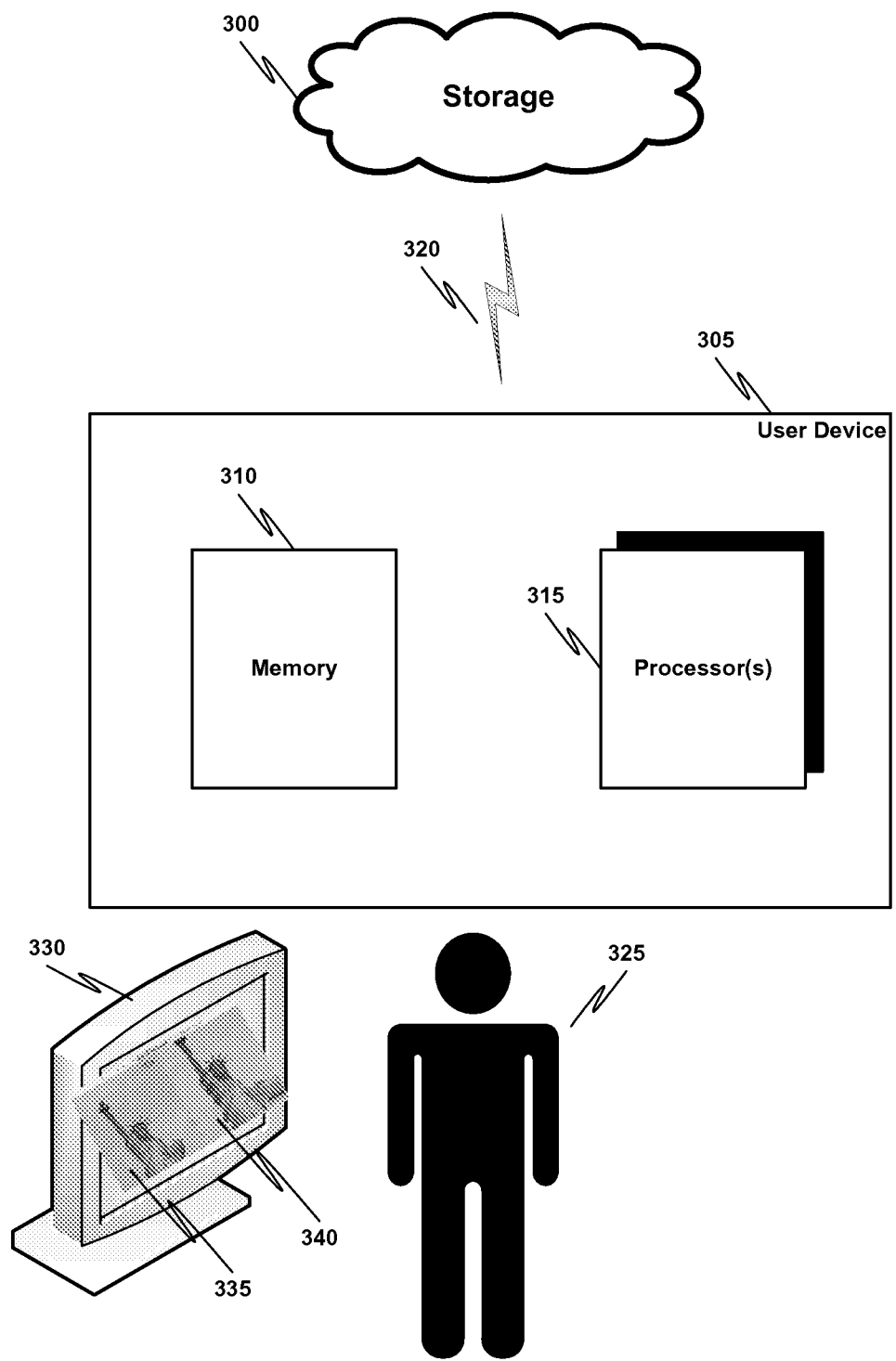
FIG. 3 is a block diagram that illustrates an example apparatus for digital image comparison.

FIG. 3 is a block diagram that illustrates an apparatus for digital image comparison, in accordance with one embodiment. As shown in FIG. 3, user device 305 includes a memory 310 and one or more processors 315. The one or more processors 315 are configured to, while executing a single instance of an application stored in the memory 310, receive an input from a user 325 of the user device 305, identifying a plurality of digital images (335, 340). The one or more processors 315 are further configured to examine the identification of the plurality of digital images (335, 340). The one or more processors 315 are further configured to render the plurality of digital images (335, 340) for display on one display device 330. The rendered digital images (335, 340) are viewable by the user 325 simultaneously on the display device 330.

Figure 4:
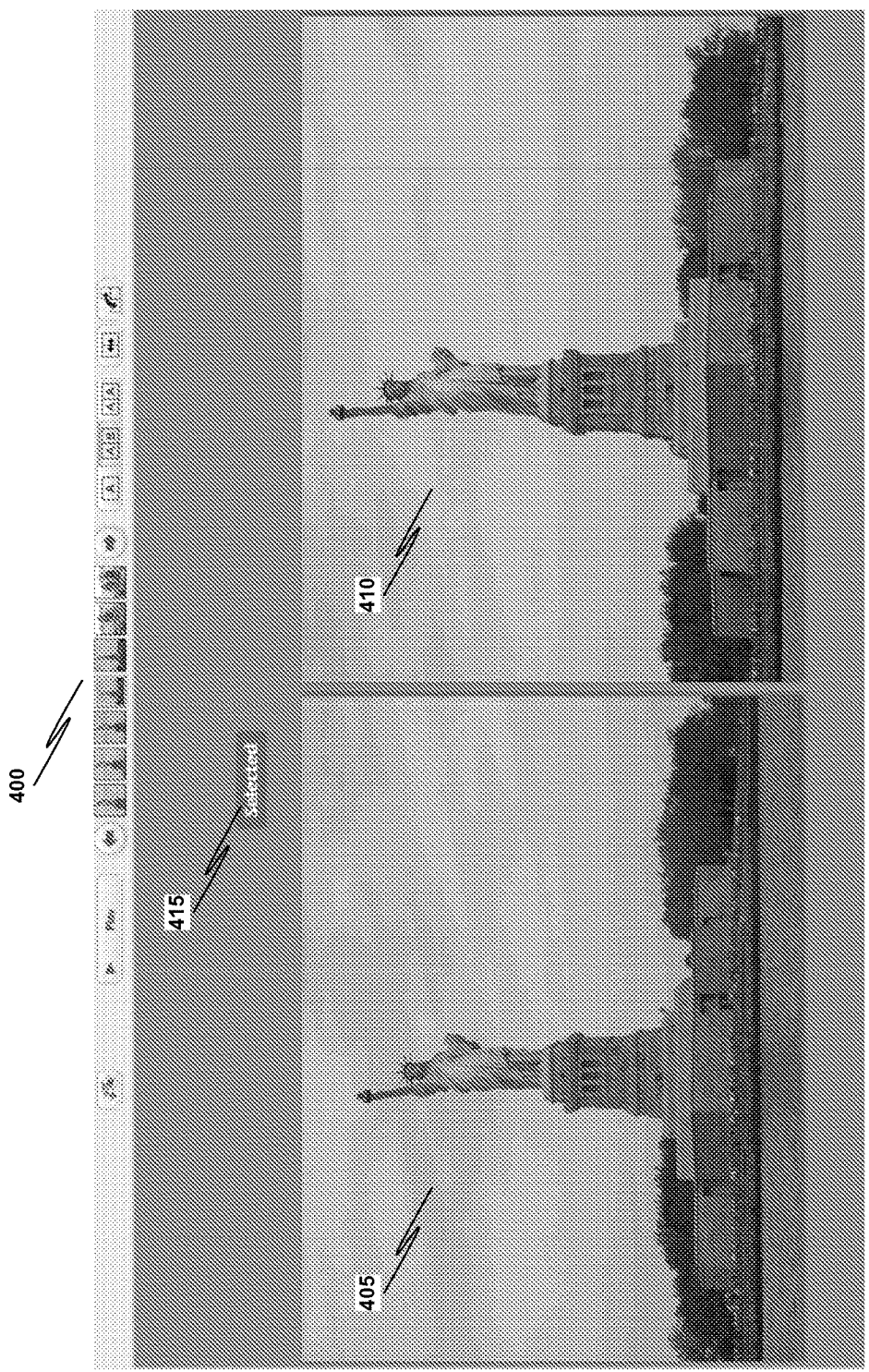
FIG. 4 is a screenshot that illustrates an example display of multiple digital images by a single application program.

FIG. 4 is a screenshot that illustrates a display of multiple digital images by a single application program, in a view having two pictures in a row, in accordance with one embodiment. As shown in FIG. 4, a user interface 400 of an application displays two digital images (405, 410) of the same scene, for example when a user takes two photographs of the same scene. Indicator 415 indicates that digital image 405 is presently selected. Image processing controls shown at the top of user interface 400 may be used to perform image processing on the selected digital image 405. A user may select more than one of the digital images (405, 410) for a particular type of image processing. For example, a user may select only digital image 405 and perform a reduction operation. The user could also select both digital image 405 and digital image 410 and perform a reduction operation simultaneously on both digital image 405 and digital image 410.

Figure 5:
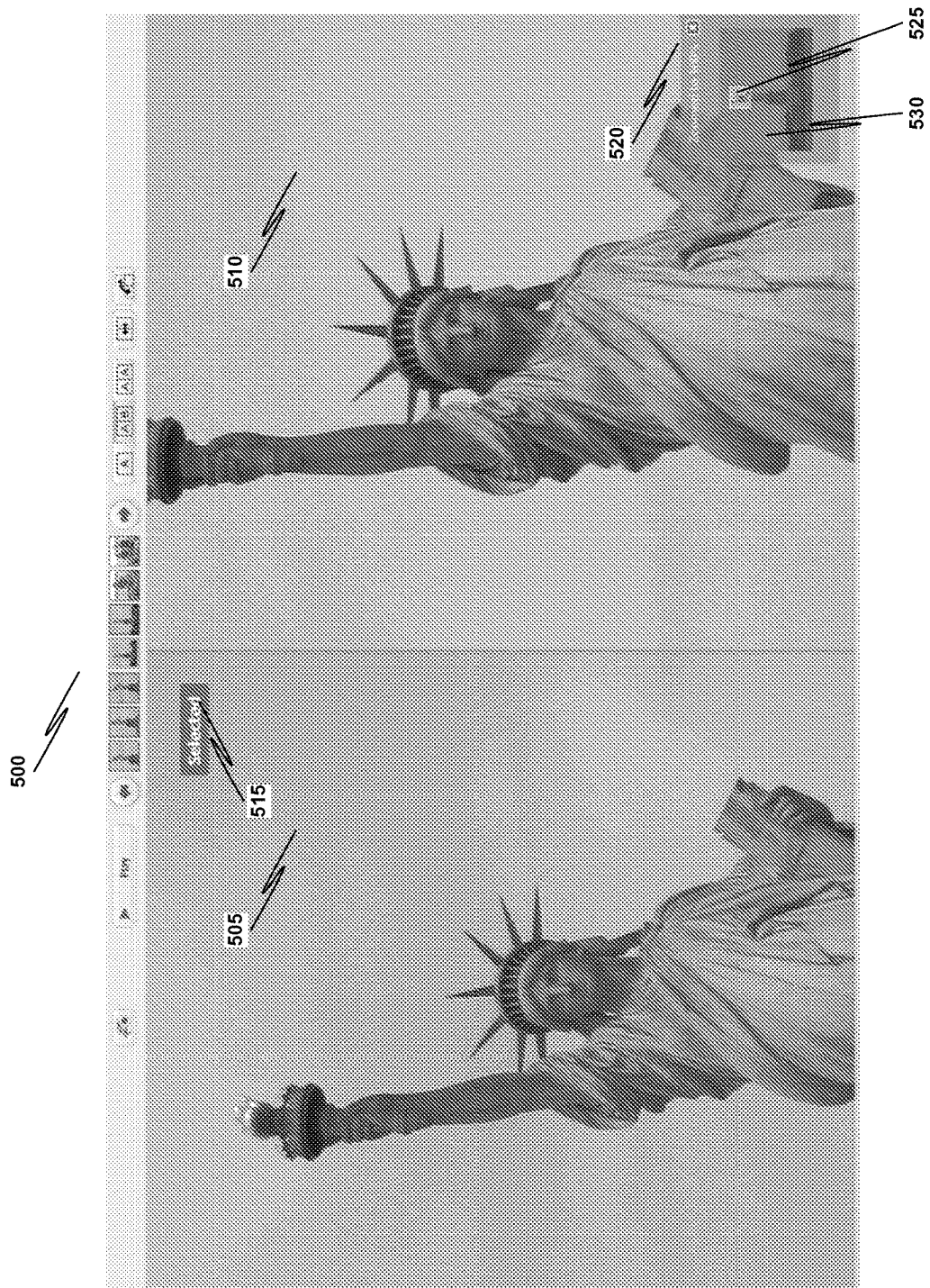
FIG. 5 is a screenshot that illustrates an example display of multiple digital images by a single application program, in a zoomed view having two pictures in a row.

FIG. 5 is a screenshot that illustrates a display of multiple digital images by a single application program, in a zoomed view having two pictures in a row, in accordance with one embodiment. As shown in FIG. 5, a user interface 500 of an application displays two digital images (505, 510) of the same scene, for example when a user takes two photographs of the same scene. FIG. 5 shows the display of FIG. 4 after selecting the "Zoom" operation. Indicator 515 indicates that digital image 505 is presently selected. Image processing controls shown at the top of user interface 500 may be used to perform image processing on the selected digital image 505. Box 520 shows the original image 530 and the selected portion 525 of the original image 530 shown in image 505.

Figure 6:
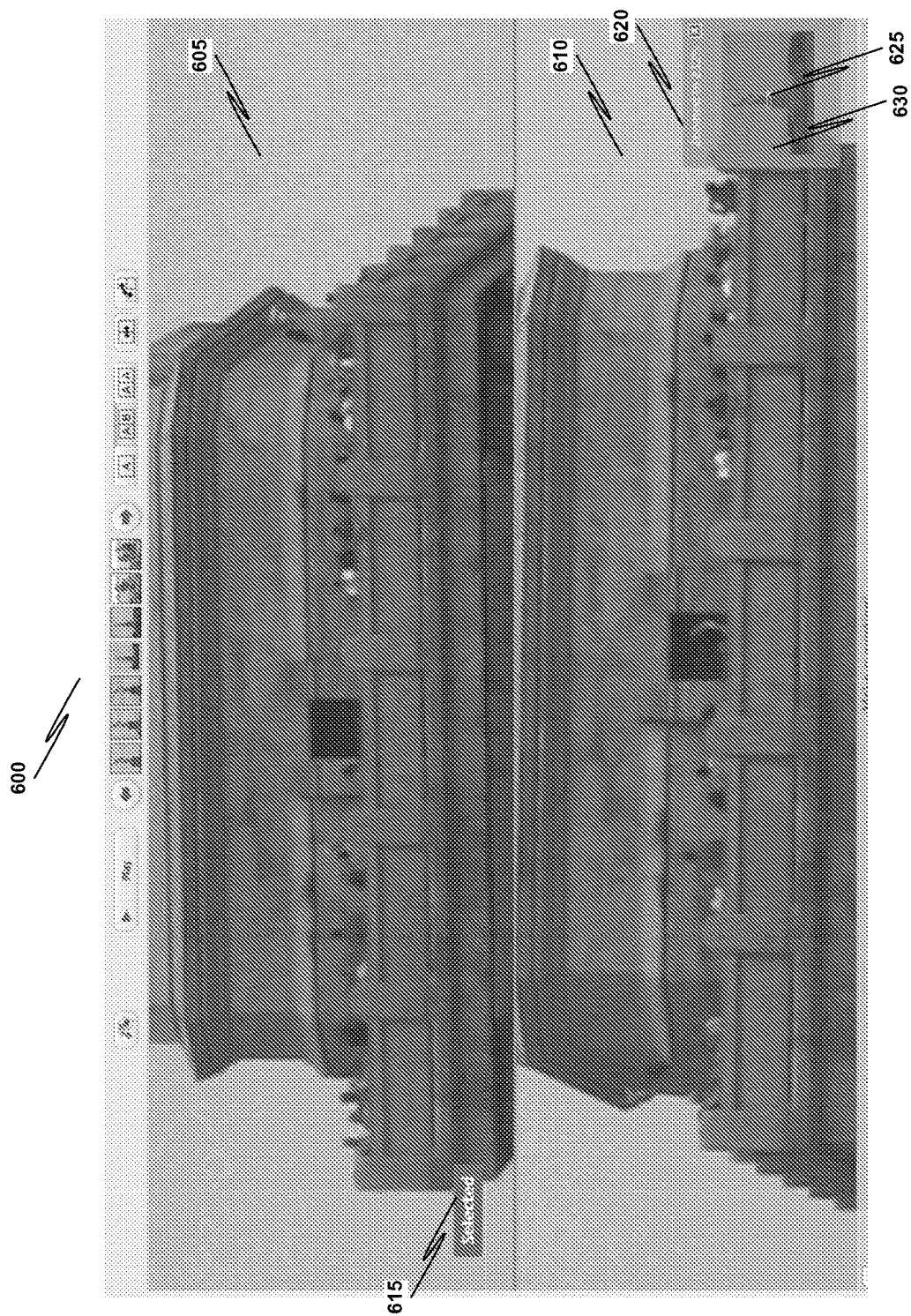
FIG. 6 is a screenshot that illustrates an example display of multiple digital images by a single application program, in a zoomed view having two pictures in a column.

FIG. 6 is a screenshot that illustrates a display of multiple digital images by a single application program, in a zoomed view having two pictures in a column, in accordance with one embodiment. As shown in FIG. 6, a user interface 600 of an application displays two digital images (605, 610) of the same scene, for example when a user takes two photographs of the same scene. FIG. 6 shows a display resulting after selecting the "Zoom" operation. Indicator 615 indicates that digital image 605 is presently selected. Image processing controls shown at the top of user interface 600 may be used to perform image processing on the selected digital image 605. Box 620 shows the original image 630 and the selected portion 625 of the original image 630 shown in image 605.

The use of sensitive user data, such as facial data, may be selectively used based on preferences of the user. For example, the use of facial data in image 605 and image 610 may be selectively used based on preferences of the user.

According to one embodiment, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or a combination thereof. The software may be stored on a program storage device readable by a machine.

It should be noted that the present disclosure is described by example. The example embodiments illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

Figure 7:
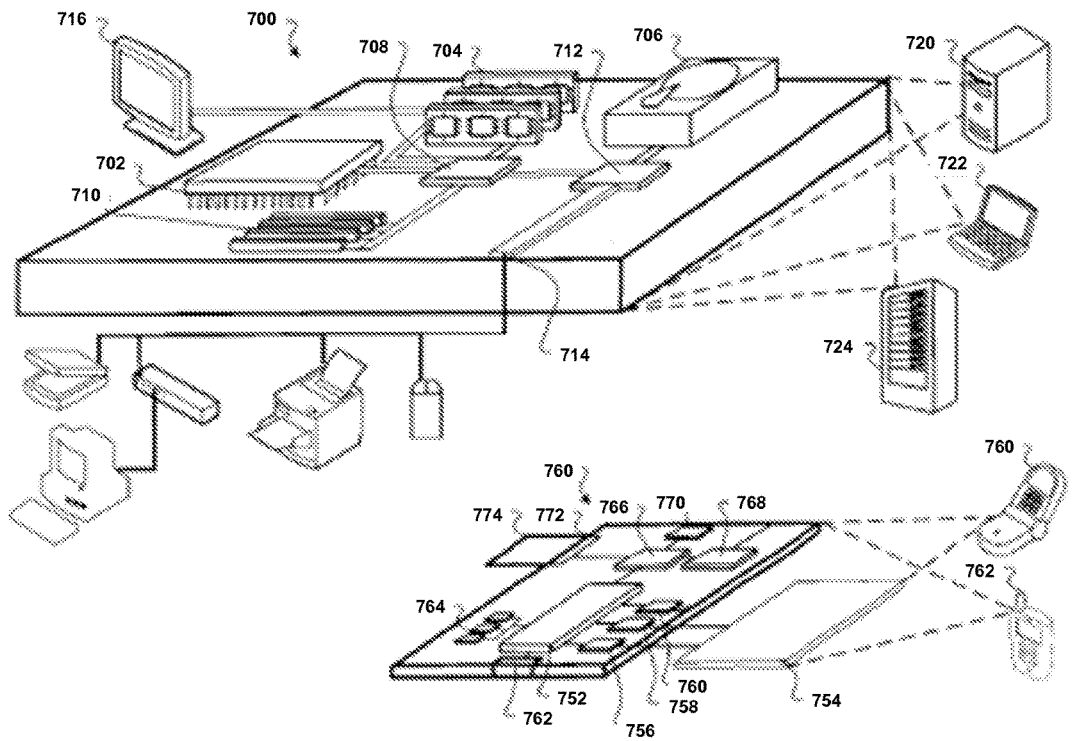
FIG. 7 is a block diagram of example computing devices that may be used to implement the systems and methods described in this document.

FIG. 7 is a block diagram of computing devices 700, 750 that may be used to implement the systems and methods described in this document, as either a client or as a server or plurality of servers. Computing device 700 is intended to represent various forms of digital computers, for example laptops, desktops, workstations, personal digital assistants, servers, blade servers, mainframes, tablets, and other appropriate computers. Computing device 750 is intended to represent various forms of mobile user devices, for example personal digital assistants, cellular telephones, smartphones, and other similar computing devices. Additionally computing device 700 or 750 can include Universal Serial Bus (USB) flash drives. The USB flash drives may store operating systems and other applications. The USB flash drives can include input/output components, for example a wireless transmitter or USB connector that may be inserted into a USB port of another computing device. The components shown here, their connections and relationships, and their functions, are meant to be examples, and are not meant to limit the described implementations.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, for example display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, for example a magnetic or optical disk.

The storage device 706 is capable of providing mass storage for the computing device 700. In one implementation, the storage device 706 may be or contain a computer-readable medium, for example a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, for example those described above. The information carrier is a computer- or machine-readable medium, for example the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, for example a keyboard, a pointing device, a scanner, or a networking device for example a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer for example a laptop computer 722. Alternatively, components from computing device 700 may be combined with other components in a mobile user device (not shown), for example device 750. Each of such devices may contain one or more of computing device 700, 750, and an entire system may be made up of multiple computing devices 700, 750 communicating with each other.

Computing device 750 includes a processor 752, memory 764, an input/output device for example a display 754, a communication interface 766, and a transceiver 768, among other components. The device 750 may also be provided with a storage device, for example a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, for example control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, for example placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, for example those described above. The information carrier is a computer- or machine-readable medium, for example the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, for example GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, for example using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, for example through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile user device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While embodiments and applications of this disclosure have been shown and described, modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
   identifying, by one or more processors, related portions of a plurality of digital images;
   causing a simultaneous display of the related portions of the plurality of digital images;
   receiving a selection of two or more of the plurality of digital images;
   performing a particular type of digital image processing on the related portions of the two or more of the plurality of digital images;
   causing simultaneous presentation of results of the performing the particular type of digital image processing on the related portions of the two or more of the plurality of digital image; and
   receiving an indication of which of the two or more of the plurality of digital images to keep and which of the two or more of the plurality of digital images to discard after performing the particular type of digital image processing on the related portions of the two or more of the plurality of digital images.

2. The computer-implemented method of claim 1 wherein performing the particular type of digital image processing is in a synchronous manner on the two or more of the plurality of digital images.

3. The computer-implemented method of claim 1 wherein performing the particular type of digital image processing includes performing the particular type of digital image processing differently for each of the two or more of the plurality of digital images.

4. The computer-implemented method of claim 3 wherein performing the particular type of digital image processing differently includes performing the particular type of digital image processing on each of the two or more of the plurality of digital images based on a histogram of the respective two or more of the plurality of digital images.

5. The computer-implemented method of claim 1 wherein performing the particular type of digital image processing is performed in response to user selection of one or more image processing controls presented in a displayed user interface.

6. The computer-implemented method of claim 1 wherein the particular type of digital image processing includes at least one of: an enlargement transformation, a reduction transformation, a rotation transformation, a color correction, and scrolling.

7. The computer-implemented method of claim 1 wherein identifying the related portions of the plurality of digital images includes using content-based image retrieval.

8. The computer-implemented method of claim 1 wherein receiving the selection of the two or more of the plurality of digital images includes receiving user input from a user indicating the selection of the two or more of the plurality of digital images.

9. The computer-implemented method of claim 1 wherein the related portions of the plurality of digital images include at least a portion of a corresponding scene depicted in each of the plurality of digital images.

10. An apparatus comprising:
    a memory storing a plurality of digital images;
    a display device; and
    one or more processors configured to:
       identify, by one or more processors, related portions of the plurality of digital images;
       cause a simultaneous display of the related portions of the plurality of digital images by the display device;
       receive a selection of two or more of the plurality of digital images, wherein the selection is based on first user input;
       perform a particular type of digital image processing on the related portions of the two or more of the plurality of digital images, wherein the particular type of digital image processing is based on second user input;
       cause simultaneous presentation of results of the performing the particular type of digital image processing on the related portions of the two or more of the plurality of digital images; and
       receive an indication of which of the two or more of the plurality of digital images to keep and which of the two or more of the plurality of digital images to discard after performing the particular type of digital image processing on the related portions of the two or more of the plurality of digital images.

11. The apparatus of claim 10 wherein the one or more processors are configured to perform the particular type of digital image processing in a synchronous manner on the two or more of the plurality of digital images.

12. The apparatus of claim 10 wherein the one or more processors are configured to perform the particular type of digital image processing differently for each of the two or more of the plurality of digital images.

13. The apparatus of claim 10 wherein the one or more processors perform the particular type of digital image processing in response to user selection of one or more image processing controls presented in a displayed user interface are further configured to receive an indication of which of the two or more of the plurality of digital images to retain after the performing the particular type of digital image processing on the related portions of the two or more of the plurality of digital images.

14. The apparatus of claim 10 wherein the particular type of digital image processing includes at least one of: an enlargement transformation, a reduction transformation, a rotation transformation, a color correction, and scrolling.

15. The apparatus of claim 10 wherein the one or more processors are configured to identify the related portions of the plurality of digital images using at least one of: content-based image retrieval, image retrieval based on region shape similarity, and image similarity based on graph matching.

16. The apparatus of claim 10 wherein the related portions of the plurality of digital images include at least a portion of a corresponding scene depicted in each of the plurality of digital images.

17. A non-transitory computer readable medium having stored thereon software instructions that, when executed by one or more processors, cause the one or more processors to perform operations including:
   identifying, by the one or more processors, related portions of a plurality of digital images;
   causing a simultaneous display of the related portions of the plurality of digital images;
   receiving a selection of two or more of the plurality of digital images;
   performing a particular type of digital image processing on the related portions of the two or more of the plurality of digital images;
   causing simultaneous presentation of results of the performing the particular type of digital image processing on the related portions of the two or more of the plurality of digital image; and
   receiving an indication of which of the two or more of the plurality of digital images to keep and which of the two or more of the plurality of digital images to discard after performing the particular type of digital image processing on the related portions of the two or more of the plurality of digital images.

18. The non-transitory computer readable medium of claim 17 wherein performing the particular type of digital image processing is in a synchronous manner on the two or more of the plurality of digital images.

19. The non-transitory computer readable medium of claim 17 wherein the operation of performing the particular type of digital image processing is performed in response to user selection of one or more image processing controls presented in a displayed user interface.

20. The non-transitory computer readable medium of claim 17 wherein the particular type of digital image processing includes at least one of: an enlargement transformation, a reduction transformation, a rotation transformation, a color correction, and scrolling.

\* \* \* \* \*